G. H. HARVEY.
METHOD OF MAKING SHEETS OR PLATES OF OPALITE OR OPALESCENT GLASS.
APPLICATION FILED JULY 22, 1908.
949,183.
Patented Feb. 15, 1910.
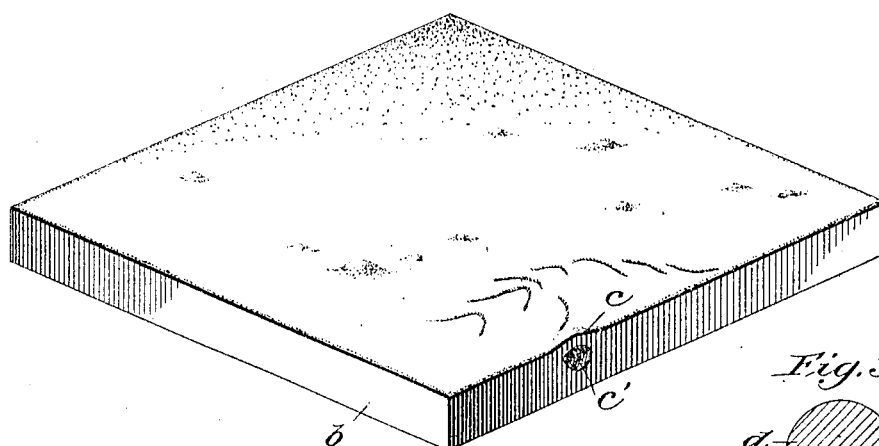
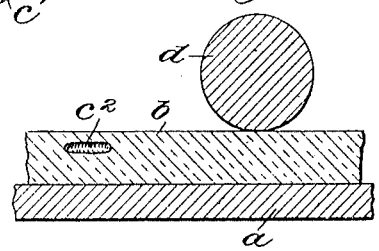
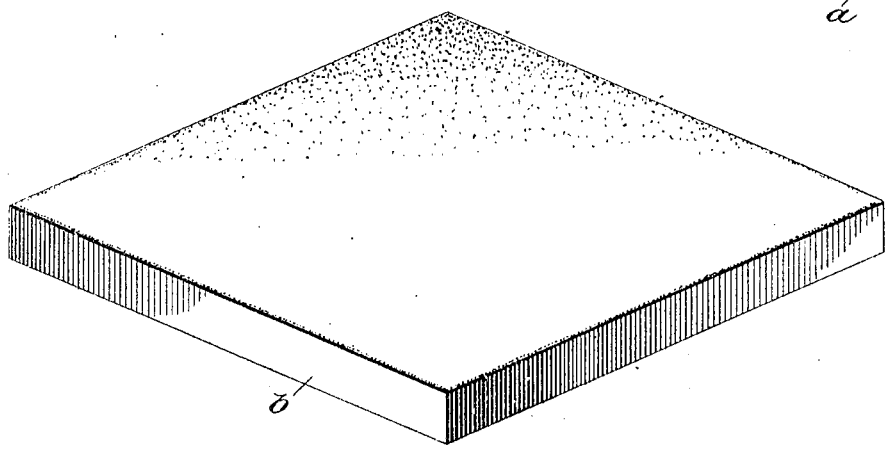
Witnesses:
Inventor:
George H. Harvey,
by W. B. Corwin,
Atty.

UNITED STATES PATENT OFFICE.

GEORGE H. HARVEY, OF ROCHESTER, PENNSYLVANIA.

METHOD OF MAKING SHEETS OR PLATES OF OPALITE OR OPALESCENT GLASS.

949,183.     Specification of Letters Patent.     Patented Feb. 15, 1910.

Application filed July 22, 1908. Serial No. 444,752.

*To all whom it may concern:*

Be it known that I, GEORGE H. HARVEY, a citizen of the United States, residing at Rochester, in the county of Beaver and State of Pennsylvania, have invented a Method of Making Sheets or Plates of Opalite or Opalescent Glass, of which the following is a specification.

My invention relates to a method of making comparatively thick sheets or plates of opalite or opalescent or similar glass, which glass is ordinarily of a milky-white color and is partially translucent in character. Such sheets of glass are ordinarily made by the use of a bed-plate or casting table and a roller which spreads or flattens the material when placed thereon in a plastic condition into sheet or plate form. Owing to its character, however, which differs somewhat from ordinary glass employed to form transparent window or plate glass, a sheet of opalite or opalescent glass when such flattening operation has been completed, especially in the heavier or thick sizes, shows almost invariably an imperfect upper surface, bubbles or knobs or small protuberances and blisters appearing therein and marring its apearance, preventing the employment of the sheet as an entirety or when cut into large sections. In consequence, such sheets with these marred surfaces have had to be cut up into small sections, and in such cutting the bubbles or knobs or small protuberances and the blisters or other imperfections on the surface have to be cut away, necessitating heavy loss.

With the use of my improved method of manufacture, the loss due to imperfect surfaces is almost entirely eliminated, and sheets or plates of glass of the character specified are produced having substantially smooth and even surfaces.

I shall now describe my improved method so that others skilled in the art may practice the same, reference being had to the accompanying drawing, in which—

Figure 1 is a view in perspective of a portion of a sheet of opalite or opalescent glass produced by the method in common use prior to my present invention. Fig. 2 is a similar view of a piece of the same sort of material produced by the aid of my invention; Fig. 3 is a view illustrating the manner in which a bubble in the material is compelled to assume a flattened shape instead of the ordinary globular form.

The mass of plastic vitreous material to be formed into a sheet of opalite or opalescent glass is placed upon the casting or rolling table $a$, and a roller is passed over the same, rolling the plastic material out into sheet or plate form $b$. Heretofore, this has been the end of the operation of making the sheet so far as shaping it is concerned, but my invention contemplates an additional step. After the sheet has been thus formed, and the upper surface or skin thereof has hardened to a greater or less degree and opportunity has been afforded to permit surface imperfections, such as knobs or protuberances or blisters to appear caused by gaseous bubbles $c'$, the roller $d$ is rolled back over the sheet of glass, and if found desirable may be again rolled forward over the same, and these back and forth passages of the roller may be repeated as often as desired or found necessary to impart the required surface finish to the sheet. It is ordinarily found desirable to permit a small interval of time to elapse between the successive passages of the roller over the sheet. The rolling of the material after it has been formed into a sheet and before the sheet has become completely hardened rolls down any knobs or small protuberances and smooths out any blisters or other imperfections in the upper surface of the material caused by the presence of bubbles or deposits of gas in the interior of the sheet, the rolling being continued until the surface or skin of the sheet of glass has become hard enough to resist the outward pressure of the gas tending to form the knobs or protuberances, the bubbles $c'$ being compelled to assume a flattened form as shown at $c^2$, instead of the usual globular form. Such operation produces a sheet of glass having a smooth uniform upper surface throughout.

I claim:—

1. The method of making sheets or plates of opalite or opalescent glass or similar material, which consists in subjecting a mass of such material in a plastic condition to an operation whereby the same is formed into a plate or sheet, and subsequently, after the upper surface or skin of the sheet so formed has hardened to a greater or less degree and opportunity has been afforded to permit surface imperfections such as knobs or blisters to appear, subjecting said sheet to a rolling operation whereby said knobs or blisters are flattened out and brought substantially into the plane of the upper surface of the sheet.

2. The method of making sheets or plates of opalite or opalescent or similar glass, which consists in subjecting a mass of such material in a plastic condition to an operation whereby the same is formed into a plate or sheet, and subsequently, after the upper surface or skin of the sheet so formed has hardened to a greater or less degree and opportunity has been afforded to permit surface imperfections such as knobs or blisters to appear, subjecting said sheet to a plurality of rolling operations whereby said knobs or blisters are flattened out and brought substantially into the plane of the upper surface of the sheet.

3. The method of making sheets or plates of opalite or opalescent glass or similar material, which consists in subjecting a mass of such material in a plastic condition to a rolling operation whereby the same is formed into a sheet, and subsequently, after the upper surface of the sheet so formed has hardened to a greater or less degree and opportunity has been afforded to permit surface imperfections such as knobs or blisters to appear, subjecting said sheet to a second rolling whereby said knobs or blisters are flattened out and brought substantially into the plane of the upper surface of the sheet.

4. The method of making sheets or plates of opalite or opalescent glass or similar material, which consists in subjecting a mass of such material in a plastic condition to a rolling operation whereby the same is formed into a sheet, and subsequently, after the upper surface of the sheet so formed has hardened to a greater or less degree and opportunity has been afforded to permit surface imperfections such as knobs or blisters to appear, subjecting said sheet to a plurality of rolling operations whereby said knobs or blisters are flattened out and brought substantially into the plane of the upper surface of the sheet.

In testimony whereof I have hereunto set my hand.

GEORGE H. HARVEY.

Witnesses:
S. W. HARPER,
B. RICHARDSON.